(12) United States Patent
Ruck et al.

(10) Patent No.: US 6,474,713 B1
(45) Date of Patent: Nov. 5, 2002

(54) MULTIPLE CONFIGURATION BULKHEAD

(75) Inventors: George Edward Ruck, Grosse Ile, MI (US); Dave Roy Saville, Chelmsford (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,330

(22) Filed: Aug. 21, 2001

(51) Int. Cl.[7] .............................................. B60R 21/00
(52) U.S. Cl. ...................... 296/24.1; 280/748; 410/129
(58) Field of Search ........................ 296/26.08, 146.15, 296/146.16, 190.08, 190.11, 183, 24.1; 280/748; 410/121, 129

(56) References Cited

U.S. PATENT DOCUMENTS

| | | | |
|---|---|---|---|
| 3,249,382 A | * 5/1966 | Swithenbank | ........ 296/26.08 X |
| 4,173,369 A | * 11/1979 | Roggin | ....................... 296/24.1 |
| 4,941,718 A | 7/1990 | Alexander, III et al. | |
| 5,246,261 A | * 9/1993 | McCormack | ............... 296/24.1 |
| 5,263,757 A | * 11/1993 | Reed | ................... 296/26.08 X |
| 5,466,028 A | 11/1995 | Nicopolis | |
| 5,636,891 A | 6/1997 | Van Order et al. | |
| 5,829,813 A | 11/1998 | LaValle | |
| 6,186,459 B1 | 2/2001 | Ma | |
| 6,357,979 B1 | * 3/2002 | Montagna et al. | .......... 410/129 |

\* cited by examiner

*Primary Examiner*—Dennis H. Pedder
(74) *Attorney, Agent, or Firm*—Gigette Bejin

(57) ABSTRACT

A multiple configuration bulkhead for a cargo vehicle including an operator space having a seat with a seat back, a cargo space having a predetermined width and height adjacent the operator space, a stationary portion therebetween extending substantially the width and height of the cargo space having a cut out portion, and a removable upper portion detachably carried by the cut out portion of the stationary portion.

10 Claims, 4 Drawing Sheets

MULTIPLE CONFIGURATION BULKHEAD

BACKGROUND OF INVENTION

The present invention relates to a bulkhead for a cargo vehicle, and more specifically, a multiple configuration bulkhead.

Cargo vehicles, such as commercial vans and the like, typically have a bulkhead separating the driver and passenger space from the cargo space. Bulkheads separate the driver and passenger space from the cargo space by extending from one side of the vehicle to the other and from the floor of the vehicle to the ceiling. Bulkheads typically consist of a one-piece sheet metal design, but could also be a multi-piece assembly such that two large stampings spot welded together form a box beam where the upper and lower portions overlap. Plywood and high strength plastics have also been used for bulkheads. Bulkheads also often have a portion cut out near the top so as to serve as a window for the driver to see into the cargo space and beyond the rear of the vehicle via use of the rearview mirror.

Current bulkhead design provides a fixed cavity projecting rearward of the primary plane of the bulkhead behind the driver and passenger seat backs. The cavity permits the seat backs to be reclined for a more comfortable seating position for the driver and passenger. However, while providing driver and passenger comfort, this fixed cavity projects into the cargo space thereby limiting total cargo capacity as well as compromising the ability to load large objects through the side cargo door.

Elimination of the cavity so that maximum cargo capacity is ensured, however, would then infringe upon maximum driver and passenger comfort. It would therefore be beneficial to have a bulkhead that is reconfigurable in more than one position so that driver and passenger comfort and available cargo space can easily be altered to suit the specific needs of the people and cargo in the vehicle at a particular time.

SUMMARY OF INVENTION

It is an object of the present invention to provide a multiple configuration bulkhead that overcomes the disadvantages of the prior art.

It is a feature of the present invention that the multiple configuration bulkhead can be installed in more than one position such that in the first position, the cavity projects rearward and the space available for the vehicle occupants is maximized and in the second position, the bulkhead is reversed so that the cavity projects forward thereby increasing the cargo capacity of the vehicle.

The present invention advantageously provides a multiple configuration bulkhead including an operator space having seats with seat backs, a cargo space having a predetermined width and height adjacent the operator space, a stationary portion therebetween extending substantially the width and height of the cargo space having a cut out portion, and a removable upper portion detachably carried by the cut out portion of the stationary portion.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
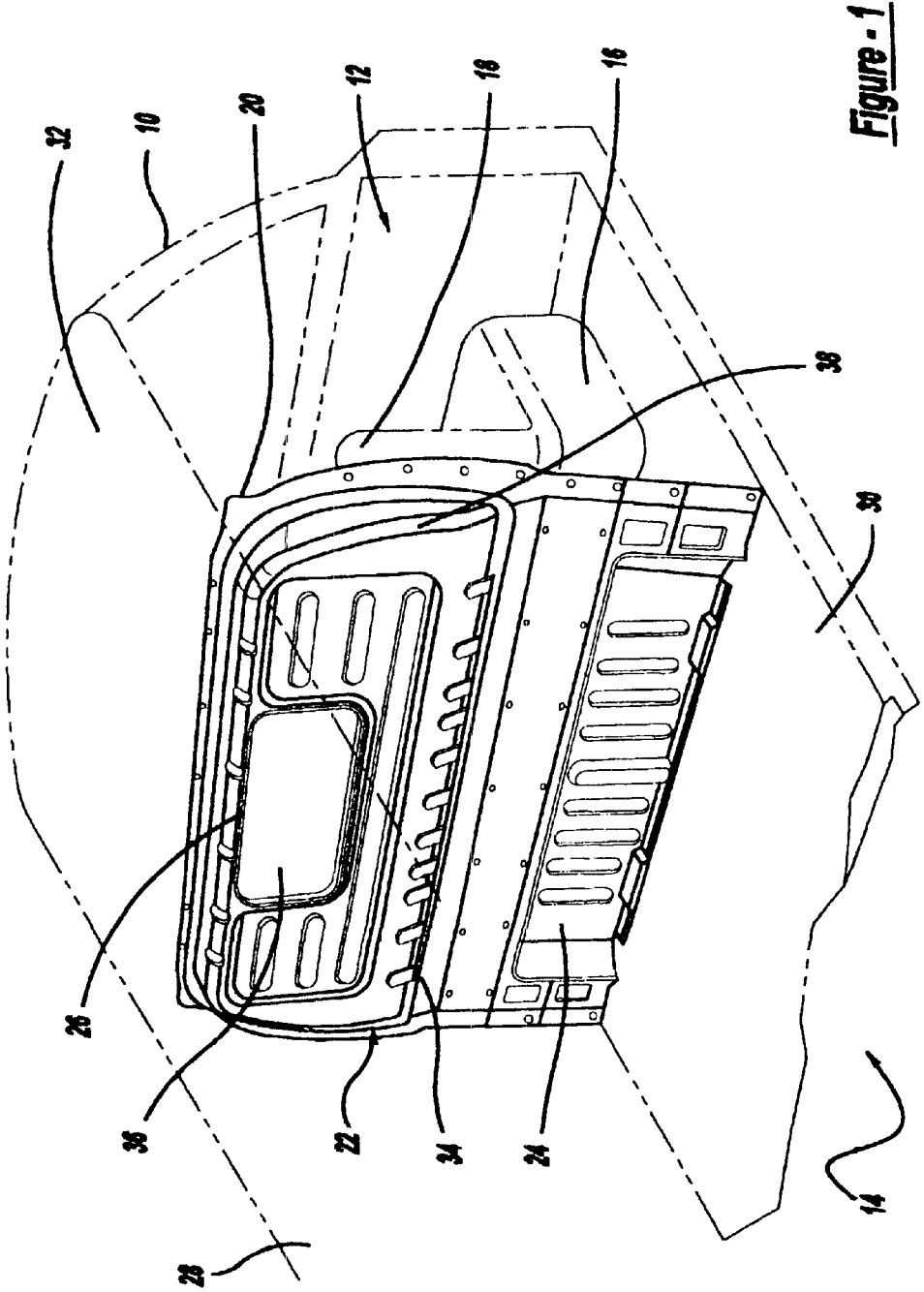
FIG. 1 is a cut-away perspective view of a cargo vehicle having a multiple configuration bulkhead in an operator enhanced position according to the present invention.

FIG. 1 shows the outline of a cargo vehicle 10 having an operator and passenger space 12 and a cargo space 14. The operator and passenger space 12 has a seat 16 for each occupant of the vehicle 10. The seats 16 have seat backs 18 that can rest upon a back wall 20 of the operator and passenger space 12 if the seats 16 are in a reclined position.

Also shown in FIG. 1 is a bulkhead 22, which has a stationary portion 24 and a removable upper portion 26. The bulkhead 22 is preferably made of sheet metal, while plywood and high strength plastics could also be used without departing from the scope of the present invention, and serves to separate the operator and passenger space 12 from the cargo space 14. As such, the back wall 20 of the operator and passenger space 12 is the front of the bulkhead 22. The bulkhead 22 could further have a mesh area (not shown) such that it is located behind the operator seat 16, or have molded-in storage compartments (not shown) without departing from the scope of the present invention.

The stationary portion 24 of the bulkhead 22 extends from a side 28 of the vehicle 10 to the other side 28, and from a floor 30 of the cargo space 14 to a ceiling 32 of the vehicle 10. The stationary portion 24 of the bulkhead 22 is a predetermined thickness. The stationary portion 24 of the bulkhead 22 has a portion cut out of a predetermined height and length a predetermined distance above the floor 30 of the cargo space 14 of the vehicle 10 in which the removable upper portion 26 is located.

The removable upper portion 26 of the bulkhead 22 is attached to an upper edge 34 of the stationary portion 24 via fitting in a slot (not shown). Other retention methods such as a latching mechanism could also be used without departing from the scope of the present invention. The removable upper portion 26 preferably has a cut out window portion 36 of predetermined height and length, but could be a no-window bulkhead without departing from the scope of the present invention. This cut out window portion 36 lies a predetermined distance inward from the vehicle 10 sides 28 and a predetermined distance above the floor 30 of the cargo space 14 of the vehicle 10. This cut out window portion 36 serves to allow the operator to see into the cargo space 14 and beyond the rear of the vehicle 10. The removable upper portion 26 of the bulkhead 22, with or without a window portion 36, could be fitted into the same stationary portion 24 for added configuration flexibility.

As also seen in FIG. 1, the removable upper portion 26 has a cavity 38. The cavity 38 in the removable upper portion 26 of the bulkhead 22 is a predetermined depth. It is shaped such that the depth decreases as distance from the ceiling 32 of the vehicle 10 increases. Other shapes, such as a constant depth profile, may be possible without departing from the scope of the present invention. This is the desired shape of the removable upper portion 26 of the bulkhead 22 so that the seat backs 18 in the operator and passenger space 12 can recline back into the cavity 38 for maximum operator and passenger comfort as shown here in a first bulkhead 22 position.

Figure 2:
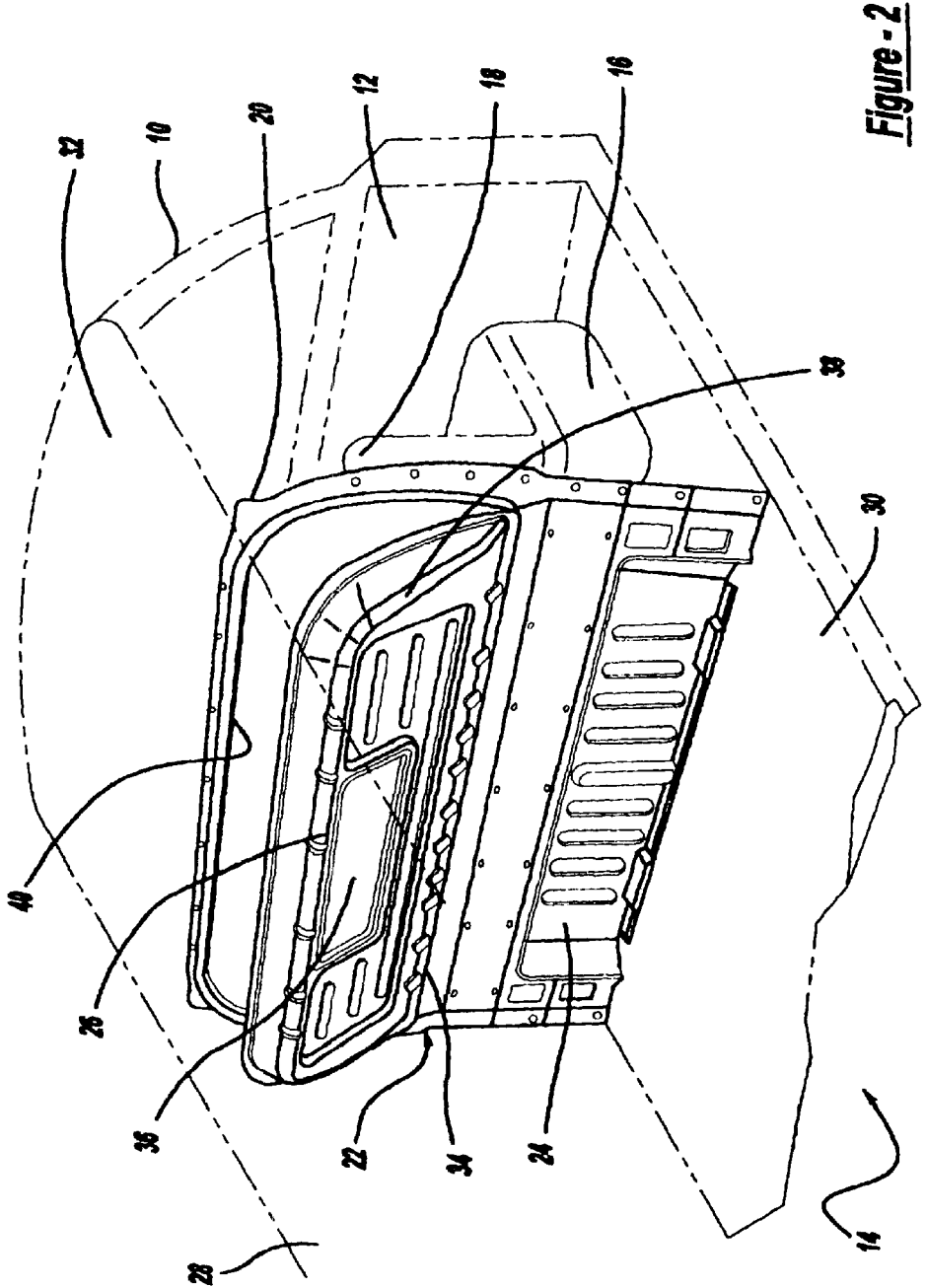
FIG. 2 is a cut-away perspective view of a cargo vehicle having a multiple configuration bulkhead in a pivoted operator enhanced position according to the present invention.
Figure 3:
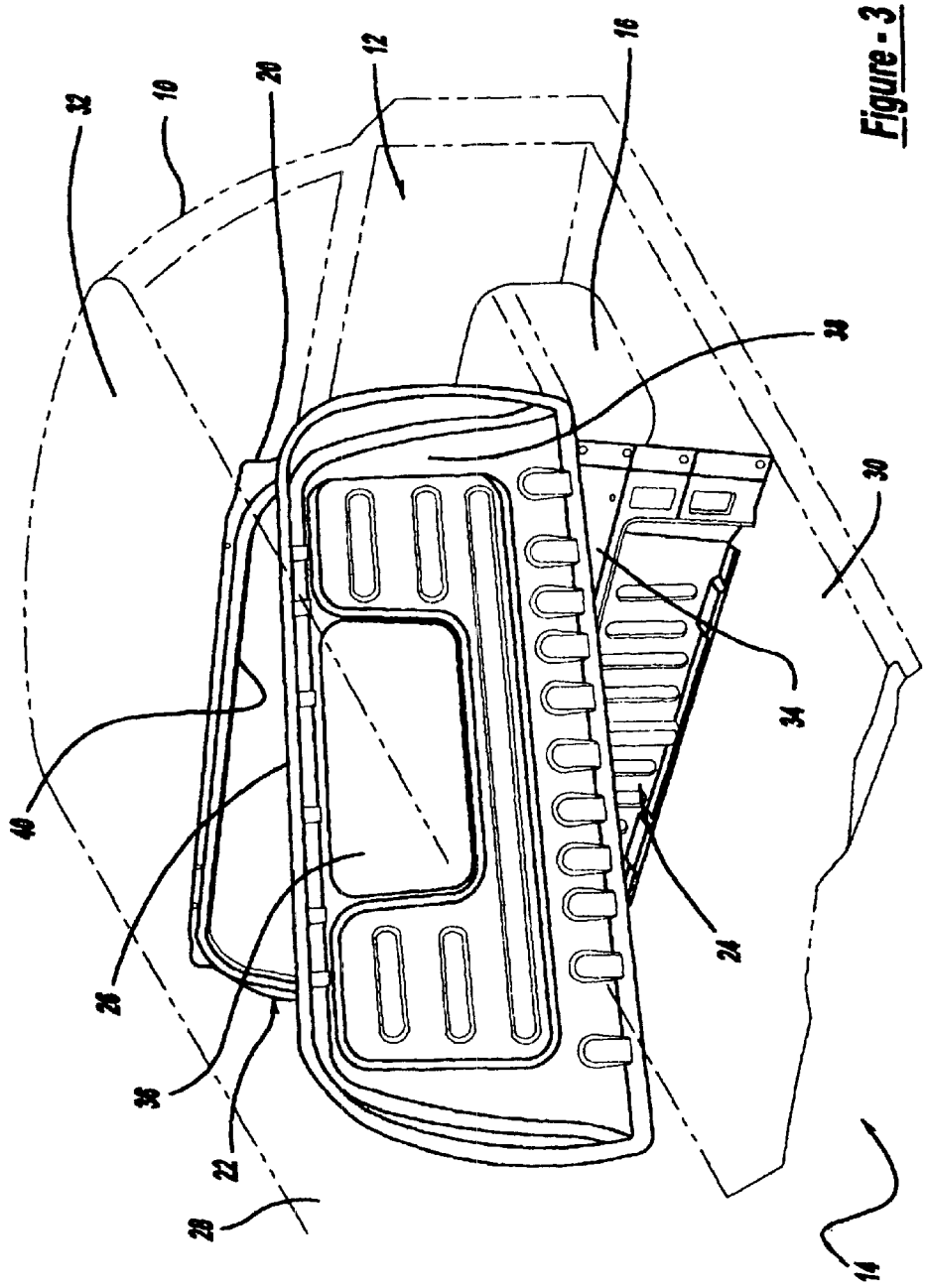
FIG. 3 is a cut-away perspective view of a cargo vehicle having a multiple configuration bulkhead in a removed position according to the present invention.

The removable upper portion 26 of the bulkhead 22 has latching hardware (not shown) at an upper surface 40, as shown in FIG. 2. This latching hardware in combination with the slot in the upper edge 34 of the stationary portion 24 allows the removable upper portion 26 of the bulkhead 22 to be pivoted rearward a predetermined distance when unlatched, as shown in FIG. 2. After the removable upper portion 26 of the bulkhead 22 is pivoted, it can then be removed from the slot in the stationary portion 24 of the bulkhead 22 and turned around 180 degrees as seen in FIG. 3. In doing so, the removable upper portion 26 of the bulkhead 22 is then ready to be placed in a second position.

Figure 4:
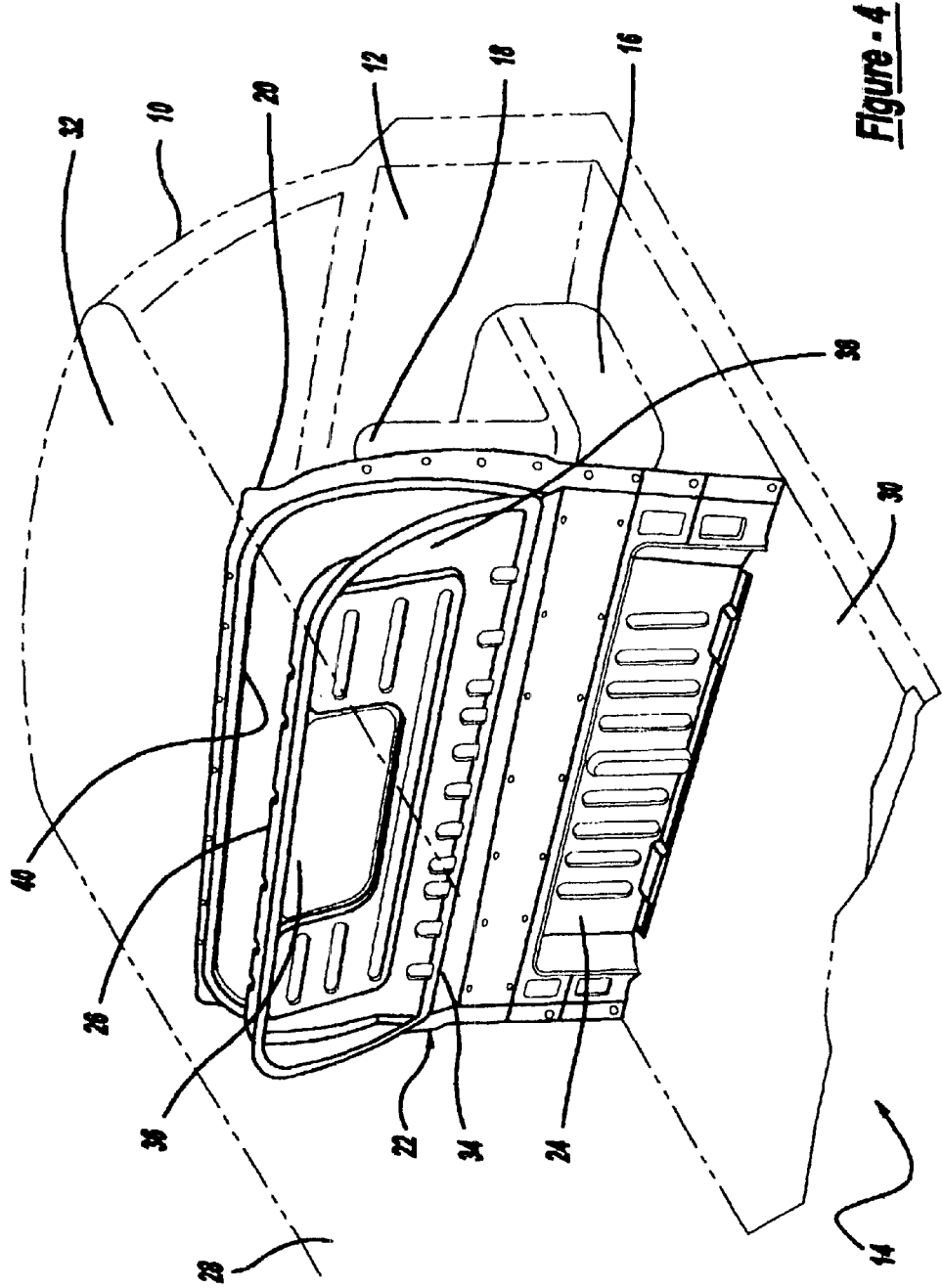
FIG. 4 is a cut-away perspective view of a cargo vehicle having a multiple configuration bulkhead in a pivoted cargo enhanced position according to the present invention.

After the removable upper portion 26 of the bulkhead 22 is turned around, it is placed in the slot in the upper edge 34 of the stationary portion 24 of the bulkhead 22 as seen in FIG. 4. Here, the removable upper portion 26 of the bulkhead 22 is again in a pivoted position, with the cavity 38 in a reversed position. Once re-attached, the removable upper portion 26 of the bulkhead 22 can then be closed and the latching hardware refastened. In this position, the cavity 38 is utilized in the cargo space 14, thereby allowing maximum cargo capacity in the vehicle 10. The same steps are followed in placing the removable upper portion 26 of the bulkhead 22 back into the first position. Such a bulkhead 22 design allows for driver and passenger comfort and available cargo space 14 to be easily altered to suit the specific needs of the people and cargo in the vehicle 10 at a particular time.

While only one embodiment of the multiple configuration bulkhead has been described, others may be possible without departing from the scope of the following claims.

What is claimed is:

1. A multiple configuration bulkhead for a cargo vehicle comprising:

an operator space having at least one seat with a seat back;

a cargo space having a predetermined width and height adjacent the operator space;

a stationary portion extending substantially the width and height of the cargo space, intermediate the go cargo and operator spaces, having a cut out portion; and a removable upper portion having a cavity with a predetermined depth detachably carried by the cut out portion of the stationary portion operable between a first position wherein the cavity extends into the cargo space and reversible to a second position wherein the cavity extends into the operator space.

2. The multiple configuration bulkhead as defined in claim 1, wherein the stationary portion has a front surface adjacent to the seat back.

3. The multiple configuration bulkhead as defined in claim 1, wherein the stationary portion has an upper end wherein the cut out portion is located.

4. The multiple configuration bulkhead as defined in claim 1, wherein the stationary portion has an upper edge whereon the removable upper portion is carried.

5. The multiple configuration bulkhead as defined in claim 1, wherein the removable upper portion has a cut out window portion.

6. The multiple configuration bulkhead as defined in claim 1, wherein the removable upper portion can be pivoted rearward a predetermined distance when detached.

7. A multiple configuration bulkhead for a cargo vehicle comprising:

an operator space having at least one seat with a seat back;

a cargo space having a predetermined width and height adjacent the operator space;

a stationary portion extending substantially the width and height of the cargo space, intermediate the cargo and operator spaces, having a cut out portion;

a removable and reversible upper portion adjacent the seat back detachably carried by the cut out portion of the stationary portion; and wherein the removable and reversible upper portion has a cavity with a predetermined depth adapted to receive the seat back when in a first operator space facing position.

8. The multiple configuration bulkhead as defined in claim 7, wherein the stationary portion has a front surface adjacent to the seat back.

9. The multiple configuration bulkhead as defined in claim 7, wherein the removable and reversible upper portion has a cut out window portion.

10. The multiple configuration bulkhead as defined in claim 7, wherein the removable and reversible upper portion can be reversed and reattached in a second cargo space facing position thereby allowing maximum cargo capacity.

* * * * *